United States Patent
Cullen et al.

[19]

[11] Patent Number: 6,006,226
[45] Date of Patent: Dec. 21, 1999

[54] METHOD AND SYSTEM FOR DOCUMENT IMAGE FEATURE EXTRACTION

[75] Inventors: John F. Cullen, Redwood City; Alex Keith, Palo Alto; Ahmad Zandi, Cupertino, all of Calif.

[73] Assignees: Ricoh Company Limited, Japan; Ricoh Corporation

[21] Appl. No.: 08/936,339

[22] Filed: Sep. 24, 1997

[51] Int. Cl.[6] .................................................. G06F 17/00
[52] U.S. Cl. .............................. 707/6; 707/4; 382/237; 382/244; 382/248
[58] Field of Search ............................ 707/4, 104, 512, 707/514, 529, 6; 348/607; 345/348; 382/248, 283, 313, 232, 112, 176, 296, 133, 237, 244

[56] References Cited

U.S. PATENT DOCUMENTS

| | | | |
|---|---|---|---|
| 4,974,034 | 11/1990 | Rabb et al. | 355/319 |
| 5,107,340 | 4/1992 | Hirata et al. | 348/607 |
| 5,446,524 | 8/1995 | Koike | 355/208 |
| 5,465,353 | 11/1995 | Hull et al. | 395/600 |
| 5,499,108 | 3/1996 | Cotte et al. | 358/400 |
| 5,604,824 | 2/1997 | Chui et al. | 382/248 |
| 5,666,897 | 9/1997 | Stolfo | 382/283 |
| 5,673,405 | 9/1997 | Tange | 345/348 |
| 5,719,970 | 2/1998 | Aoki et al. | 382/313 |
| 5,748,780 | 5/1998 | Stoflo | 382/232 |
| 5,754,674 | 5/1998 | Ott et al. | 382/112 |
| 5,761,686 | 6/1998 | Bloomberg | 707/529 |
| 5,765,176 | 6/1998 | Bloomberg | 707/514 |
| 5,778,092 | 7/1998 | MacLeod et al. | 382/176 |
| 5,790,692 | 8/1998 | Price et al. | 382/133 |
| 5,809,318 | 9/1998 | Rivette et al. | 707/512 |
| 5,818,978 | 10/1998 | Al-Hussein | 382/296 |
| 5,862,260 | 1/1999 | Rhoads | 382/232 |
| 5,881,176 | 3/1999 | Keith et al. | 382/248 |

FOREIGN PATENT DOCUMENTS

| | | | |
|---|---|---|---|
| 6-189064 | 7/1994 | Japan | H04N 1/00 |
| 2-288509 | 10/1995 | United Kingdom | G03G 15/00 |

OTHER PUBLICATIONS

Dacheng Wang et al., "Classification of Newspaper Image Blocks Using Texture Analysis," Suny Buffalo Report (undated).

Duda & Hart, "Pattern Classification and Scene Analysis," (John Wiley & Sons 1973), pp. 228–237.

Robert M. Haralick et al, "Textural Features for Image Classification," IEEE Trans. Sys., Man, Cybernetics, vol. SMC–3, No. 6, Nov. 1973.

Kenneth I. Laws, "Texture Energy Measures," Processing Image Understanding Workshop, Nov. 1979.

C.H. Chen, "A Study of Texture Classification Using Spectral Features," ICPR, Munich, Oct. 1982, pp. 1074–1077.

Lü Yan, "Interest Operator and Fast Implementation," IDP, 1988.

A. Lawrence Spitz, "Skew Determination in CCITT Group 4 Compressed Document Images," pp. 11–25 (last reference 1989).

J.J. Hull, "Document Image Matching and Retrieval with Multiple Distortion–Invariant Descriptors," pp. 379–396, IAPR Workshop DAS 1994.

Anil K. Jain et al, "Unsupervised Texture Segmentation Using Gabor Filters," Pattern Recognition, vol. 24, No. 12, pp. 1167–1186, 1991.

(List continued on next page.)

*Primary Examiner*—Wayne Amsbury
*Assistant Examiner*—Thuy Pardo
*Attorney, Agent, or Firm*—Townsend and Townsend and Crew LLP

[57] ABSTRACT

A set of image feature extraction techniques to locate and group documents based upon appearance in a database management system. The system automatically determines visual characteristics of document images and collects documents together according to the relative similarity of their document images. The system is operable on both binary and grayscale images.

27 Claims, 8 Drawing Sheets

System Overview

OTHER PUBLICATIONS

Dan S. Bloomberg, "Multiresolution Morphological Analysis of Document Images," SPIE vol. 1818, Visual Communications and Image Processing 1992.

Daniel P. Huttenlocher et al., "Comparing Images Using the Hausdorff Distance," IEEE Transactions on Pattern Analysis and Machine Intelligence, vol. 15, No. 9, pp. 850–863, Sep. 1993.

William Rucklidge, "Efficient Computation of the Minimum Hausdorff Distance for Visual Recognition," Technical Report, Dept. of Computer Science, Cornell University, Ithaca, New York, pp. 1–169, Sep. 1994.

D. Bloomberg, et al., "Extraction of Text–Related Features for Condensing Image Documents," SPIE vol. 2660, pp. 72–88, 1996.

D. Doermann, et al., "Development of a General Framework for Intelligent Document Retrieval," LAPR Workshop DAS, Oct. 1996.

M.Y. Jaisimha et al., "DocBrowse: A System for Textural and Graphical Querying on Degraded Document Image Data," IAPR Workshop DAS, Oct. 1996.

U.S. application No. 08/431,059, Mark Peairs, filed Apr. 28, 1995.

U.S. application No. 08/523,731, Mark Peairs et al., filed Sep. 5, 1995.

U.S. application No. 08/609,641, John Cullen et al., Mar. 1, 1996.

U.S. application No. 08/695,825 Jonathan J. Hull, filed Aug. 1, 1996.

U.S. applicaton No. 08/754,721, Jonathan J. Hull et al., filed Nov. 21, 1996.

Filtering

Before — 422

After — 424

Filter

420

Features

Statistical moments...

Consider a pixel values: $x_1 \ldots\ldots\ldots x_n$ $$X_{mean} = \frac{1}{N} \sum_{j=1}^{N} x_j$$

$$X_{variance} = \frac{1}{(N-1)} \sum_{j=1}^{N} (x_j - X_{mean})^2$$

METHOD AND SYSTEM FOR DOCUMENT IMAGE FEATURE EXTRACTION

CROSS-REFERENCE TO RELATED APPLICATIONS

The following related commonly-owned copending application is being filed concurrently and is hereby incorporated by reference in its entirety for all purposes:

John F. Cullen and Jonathan J. Hull, entitled, "Navigation System for Document Image Database,"; U.S. patent application Ser. No. 08/936,336, now pending and Further, this application incorporates by reference the following related U.S. Patent Applications in their entirety for all purposes:

U.S. patent application Ser. No. 08/431,059, Mark Peairs, entitled, "Iconic Paper"; now U.S. Pat. No. 5,717,940 and U.S. patent application Ser. No. 08/609,641, John F. Cullen, et. al. entitled, "Image Database Browsing and Query Using Texture Analysis", filed Mar. 1, 1996, now pending.

BACKGROUND OF THE INVENTION

This invention relates to document management systems and more particularly to providing a method for processing document image information in a database of document images.

The proliferation of low-cost, high-capacity electronic storage of document images has enabled users to keep ever increasing amounts and varieties of documents, previously stored in hard copy format, as electronic information online. While this revolution in storage technology has reduced the cost of document storage, it brings with it the need for more efficient methods of searching through a myriad of online documents to find a particular document or set of documents of interest to the user.

Methods for locating a document of interest have been rudimentary at best. Typically, in these methods, documents are scanned into the computer and an Optical Character Recognition ("OCR") program converts the image into a textual file. Next, a form of keyword matching search is performed, with the system either scanning the entire text of all documents, or a set of carefully chosen keywords thought to be representative of the document by a person who initially classified the document. The problem with the first approach is the high search cost involved with traversing a large number of documents in their entirety. The difficulty with the second approach is that different persons will employ different strategies to filing and retrieval. As the heterogeneity of documents contained in databases increases, the reliability of these traditional search methods diminishes.

Recognizing the opportunity to exploit the information content of the image portion of documents, several attempts have been made to search for documents based upon matching of small images contained in the documents. For example, M. Y. Jaisimha, A. Bruce and T. Nguyen in their work, "DocBrowse: A system for Textual and Graphical Querying on Degraded Document Image Data" describe a system which searches for documents based upon company logos in letterheads. D. Doermann, et. al. in "Development of a General Framework for Intelligent Document Retrieval," outline a system for matching documents based upon generation and matching of an image descriptor which describes low-level features and high-level structure of a document. Unfortunately, this method requires intensive processing of the image information, which greatly curtails its use in most commercial applications.

While such methods provide document search capability via elemental matching of image characterization vectors, they do not provide the basis for extracting image information useful to organize a large database of document images. Additionally, since these methods apply to grayscale images, further work needs to be done to accommodate a database of binary images. These and other shortcomings indicate that what is needed is a method and system for efficiently examining document images.

SUMMARY OF THE INVENTION

The present invention provides image feature extraction techniques to locate and group documents based upon appearance in a database system. The system automatically determines visual characteristics of document images and collects documents together according to the relative similarity of their document images. The system is operable on both binary and grayscale images.

One representative embodiment is a method that includes the steps of filtering binary document images in a database containing document images, compressing each document image using a wavelet compression algorithm, extracting feature information from the compressed image and using the feature information as a basis of searching for particular images in a document image database.

A related embodiment is a method that includes the steps of filtering binary document images in a database containing document images, compressing each document image using a wavelet compression algorithm, extracting feature information from the compressed image, extracting an iconic representation from the information from the compressed image and using the feature information as a basis of searching for particular images in a document image database.

Another representative embodiment is a method that includes the steps of compressing each document image in a database of grayscale document images using a wavelet compression algorithm, extracting feature information from the compressed image, using the feature information as a basis of searching for particular images in a document image database.

A further related embodiment is a method that includes the steps of compressing each document image in a database of grayscale document images using a wavelet compression algorithm, extracting feature information from the compressed image, extracting an iconic representation from the information from the compressed image and using the feature information as a basis of searching for particular images in a document image database.

The invention will be better understood by reference to the following detailed description in connection with the following drawings.

DESCRIPTION OF PREFERRED EMBODIMENTS

Representative System Suited to Practice the Invention

Figure 1:
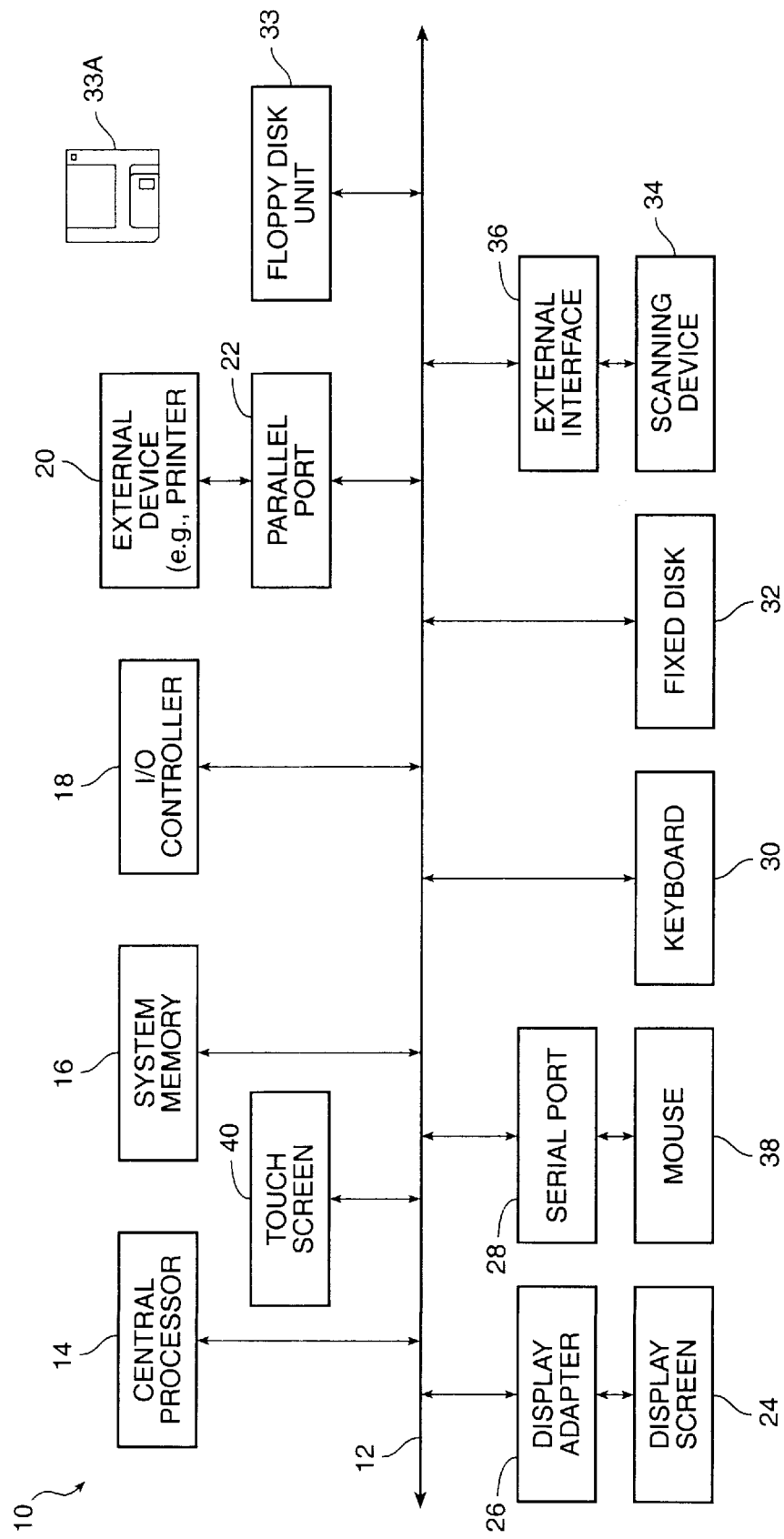
FIG. 1 depicts a representative computer system suitable for implementing the invention.

In a typical installation, the invention will be practiced on a computer system with the basic subsystems such as depicted in FIG. 1. In the representative system of FIG. 1, a computer system 10 includes bus 12 which interconnects major subsystems such as central processor 14, system memory 16, input/output (I/O) controller 18, an external device such as a printer 20 via parallel port 22, display screen 24 via display adapter 26, serial port 28, keyboard 30, fixed disk drive 32 and floppy disk drive 33 operative to receive a floppy disk 33A. Many other devices can be connected such as scanning device 34 connected via external interface 36, mouse 38 connected via serial port 28 and touch screen 40 connected directly. Many other devices or subsystems not necessarily shown here may be connected in a similar manner. Also, it is not necessary for all of the devices shown in FIG. 1 to be present to practice the present invention, as discussed below. The devices and subsystems may be interconnected in different ways from that shown in FIG. 1. The operation of a computer system such as that shown in FIG. 1 is readily known in the art and is not discussed in detail in the present application. Source code to implement the present invention may be operably disposed in system memory 16 or stored on storage media such as fixed disk 32 or floppy disk 33A. An image database may also be stored on fixed disk 32.

Display screen 24 is similar to that in use on standard computers such as personal computers, workstations or mainframe computers employing a CRT screen or monitor. Various forms of user input devices may be used with the present invention. For example, a mouse input device that allows a user to move a pointer displayed on the display screen in accordance with user hand movements in a standard user input device. A mouse usually includes one or more buttons on its surface so that the user may point to an object on the screen by moving the mouse and may select the object, or otherwise activate the object, be depressing one or more buttons on the mouse. Alternatively, a touch screen allows a user to point to objects on the screen to select an object and to move the selected object by pointing to a second position on the screen. Various buttons and controls may be displayed on the screen for activation by using the mouse or touch screen. Fixed disk drive 32 may be a hard disk drive or an optical drive or any medium suitable for storing a database of document images.

Overview of Operations Performed on Images

Several unique and innovative features provided by virtue of the present invention will now be explored in greater detail with the use of example embodiments. One innovative feature provided by virtue of the present invention is that iconic representations of document images, used to represent documents within the database, can be created from information resulting from a compression step applied to an image. The use of iconic representations to facilitate document search in a database of document images is described in co-pending and co-assigned U.S. patent application Ser. No. 08/431,059, entitled, "Iconic Paper", which is incorporated herein by reference in its entirety for all purposes. Another innovative feature of the present invention is the ability to employ grayscale image processing techniques to binary images. This eliminates the requirement of storing grayscale images in a database. See e.g. co-pending and co-assigned U.S. patent application Ser. No. 08/609,641, now pending entitled, "Image Database Browsing and Query Using Texture Analysis", which is incorporated herein by reference in its entirety for all purposes. A person of ordinary skill in the art will quickly realize that the examples that follow are not the only methods available to practice the invention.

Figure 2A:
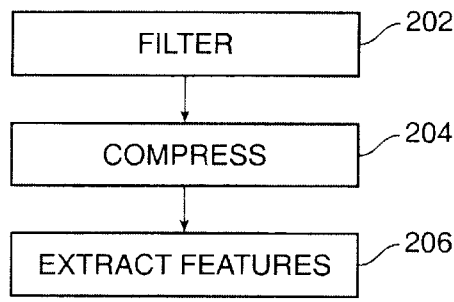
FIG. 2A depicts a flow chart of the steps performed in document image feature extraction in an embodiment of this invention.

In a particular embodiment of the invention, as depicted in FIG. 2A, each binary document image in a database containing document images is filtered in filter step 202, compressed in compression step 204 via a compression algorithm, using a technique such as wavelet compression (See e.g. IEEE Data Compression Conference, CREW: Compression with Reversible Embedded Wavelets, March 1995, which is incorporated herein by reference in its entirety for all purposes), or other techniques for compression. Next, image feature information is extracted from the compressed image during the extraction step 206. These document image features may be compared with the features of a desired particular or target document image in a search process.

Figure 2B:
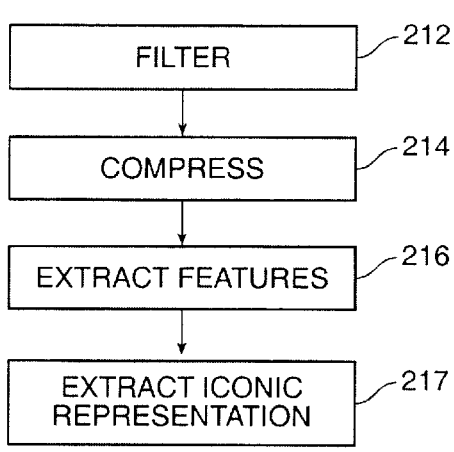
FIG. 2B depicts a flow chart of the steps performed in document image feature extraction in an embodiment of this invention.

A related embodiment of the invention, depicted in FIG. 2B interposes the additional step of reserving the low-band image representation of a document image for use as an icon for indexing to that image in the database 217. The other steps closely mirror the embodiment of FIG. 2A. Each binary document image in a database containing document images is filtered in filter step 212, compressed in compression step 214 via a compression algorithm, such as wavelet compression, or other techniques for compression. Next, image feature information is extracted from the compressed image during the extraction step 216. The iconic representation is extracted from the low-pass representation of the image in step 217. These document image features may be compared with the features of a desired particular or target document image in a search process.

Figure 3A:
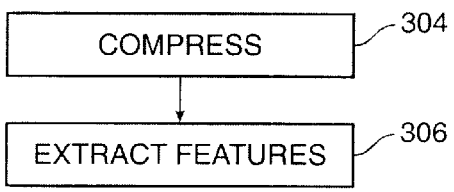
FIG. 3A depicts a flow chart of the steps performed in document image feature extraction in an embodiment of this invention.

In an alternate embodiment of the invention, as depicted in FIG. 3A, each document image in a database containing document images is compressed in compression step 304 via a compression algorithm, using wavelet compression, or other techniques for compression. Next, image feature information is extracted from the compressed image during the extraction step 306. These document image features may be compared with the features of a desired particular or target document image in a search process.

Figure 3B:
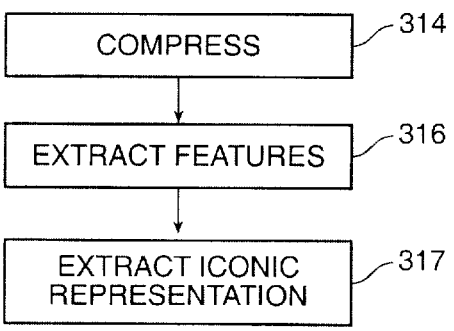
FIG. 3B depicts a flow chart of the steps performed in document image feature extraction in an embodiment of this invention.

A related embodiment of the invention, depicted in FIG. 3B interposes the additional step of reserving the low-band image representation of a document image for use as an icon for indexing to that image in the database 317. The other steps closely mirror the embodiment of FIG. 3A. Each document image in a database containing document images is compressed in compression step 314 via a compression algorithm, such as wavelet compression, or other techniques for compression. Next, image feature information is extracted from the compressed image during the extraction step 316. The iconic representation is extracted from the low-pass representation of the image in step 317. These document image features may be compared with the features of a desired particular or target document image in a search process. Techniques for using features to search and navigate a database of document images are discussed in a co-assigned co-pending U.S. patent application Ser. No. 08/936,336 entitled "Navigation System for Document Image Database," which is incorporated herein by reference in its entirety for all purposes.

Figure 4A:
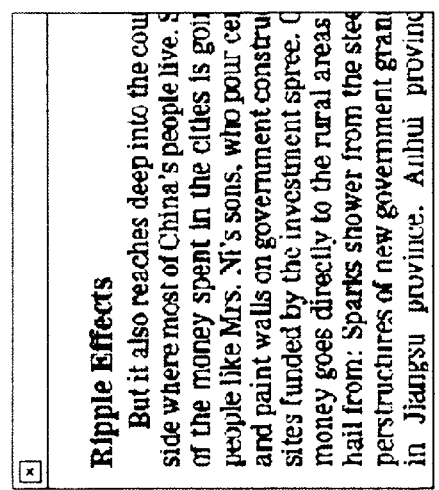
FIG. 4A depicts the use of filtering on a document image to convert a binary representation to a grayscale representation according to one embodiment of the present invention.
Figure 4A:
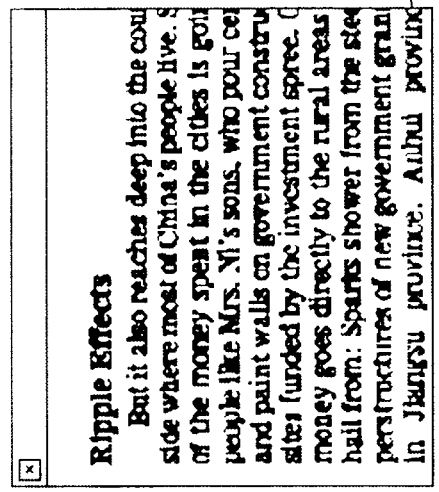
Figure 4A:
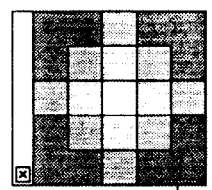
Figure 4B:
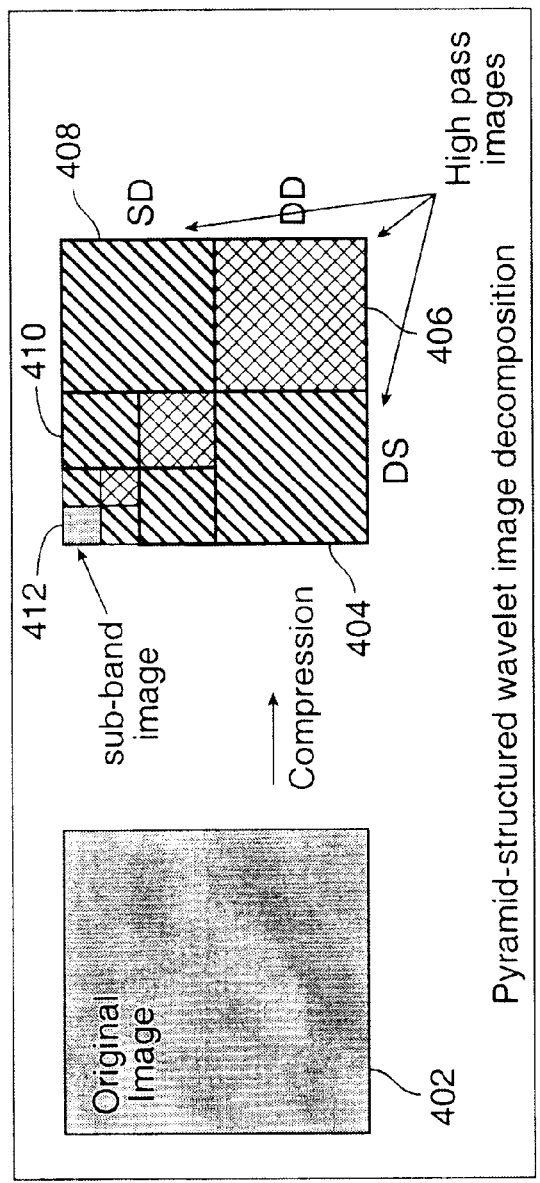
FIG. 4B depicts the use of compression on a document image to facilitate low cost storage and expedient manipulation of image components according to one embodiment of the present invention.

FIGS. 4A–8 demonstrate the use of the image processing techniques of filtering, FIG. 4A; compression, FIG. 4B; and features extraction, FIGS. 5, 6, 7 and 8 according to various aspects of the invention.

Filtering

While the invention may be practiced on grayscale document image representations, many systems employ binary imaging to store document images. In a binary system, the image acquisition device selects a threshold value, the exceeding of which causes pixel values to be assigned a 1 or black value, otherwise a 0 or white value. A person of ordinary skill in the art will quickly realize that this technique may also be implemented with the use of inverse logic, i.e. using a 1 to represent a white pixel and a 0 to represent a black pixel, as well. The chief advantage of such a system is that binary images take up relatively smaller space in a computer storage medium. By contrast, the chief advantage of grayscale images is that they maintain the recognizable structure of the document as they are reduced in size. The main drawback of grayscale images has been the cost of storage media to hold the image. As the cost of digital media continues to decline, however, this becomes less of an issue. Secondly, with the development of compression technology, it becomes possible to store grayscale images at sufficiently high compression ratios to overcome the difference in image storage requirements.

An embodiment of this invention operable on binary images begins with a filtering step. This step is not necessary for grayscale images. In the filtering step, a 5×5 Gaussian low-pass filter is used to "smooth" the binary image into a grayscale image. FIG. 4A is illustrative of the filtering process. (Gaussian image filter 420 is applied by the system to binary image 422. The resultant grayscale image 424 is capable of being acted upon by the compression techniques discussed hereinbelow.

Compression Techniques

Compression reduces the cost of storing large quantities of document images in a database. Each document image is compressed via a compression technique such as wavelet compression (See e.g. IEEE Data Compression Conference, CREW: Compression with Reversible Embedded Wavelets, March 1995, which is incorporated herein by reference in its entirety for all purposes), or other techniques for compression known in the art.

FIG. 4B is illustrative of wavelet compression, which operates by recursively applying a pyramidal transform to the image data 402, dividing the image into high frequency information in quadrants 404, 406 and 408, and low frequency information in quadrant 410. CREW has several advantages in this application. It decomposes an image into high and low pass components relatively quickly. It gives a lossy compression of 20:1, with minimal noticeable image degradation. Finally, it produces a low-pass sub-band image 412 in the upper left hand corner of the low-frequency quadrant. The sub-band image provides a recognizable iconic representation of the document. This visually recognizable version of the document can be efficiently accessed and is useful as an index to the document information.

Figure 5:
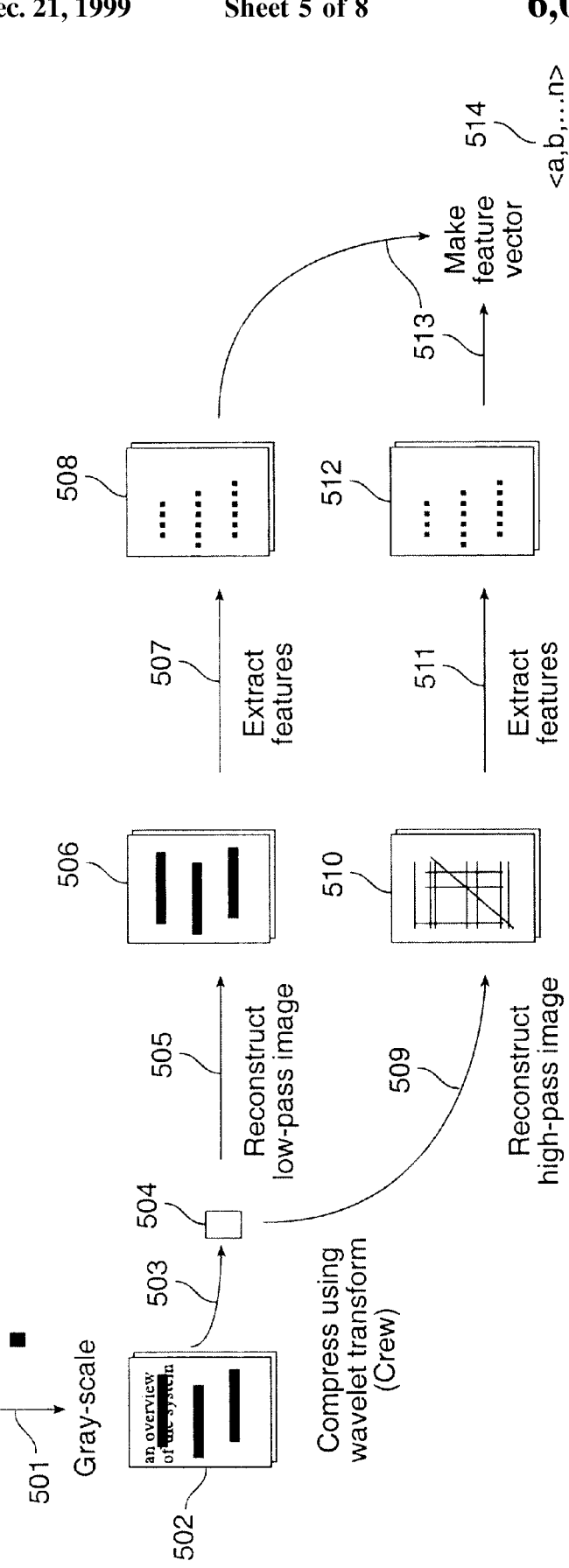
FIG. 5 depicts extraction of image feature information from compressed images to serve as the basis for image grouping according to one embodiment of the present invention.

FIG. 5 is illustrative of the processing steps by virtue of the present invention. A document image in binary format 500 is acted upon by a 5×5 Guassian smoothing filter in processing step 501 to yield a grayscale representation of the document image 502. Wavelength compression algorithm 503 is used to transform grayscale representation 502 into a compressed representation 504. Low-pass filter step 505 separates low frequency image information 506 from the compressed image representation 504. Analogously, high-pass filter step 509 separates high frequency image information 510 from the compressed Image representation 504. Features extraction step 507 performed on the low frequency image information 506 yields the mean pixel value and the variance of the pixel values features 508. Analogously features extraction step 511 performed on the high frequency image information 510 yields the number of words, number of pictures, and number of columns features 512. The low frequency and high frequency feature information is amalgamated together in step 513 to produce a feature vector 514.

Feature Extraction

Figure 6:
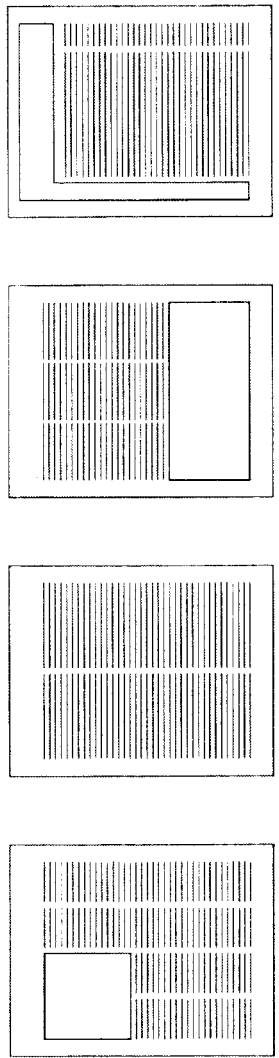
FIG. 6 depicts extraction of statistical moments from low frequency image information according to one embodiment of the present invention.
Figure 6:
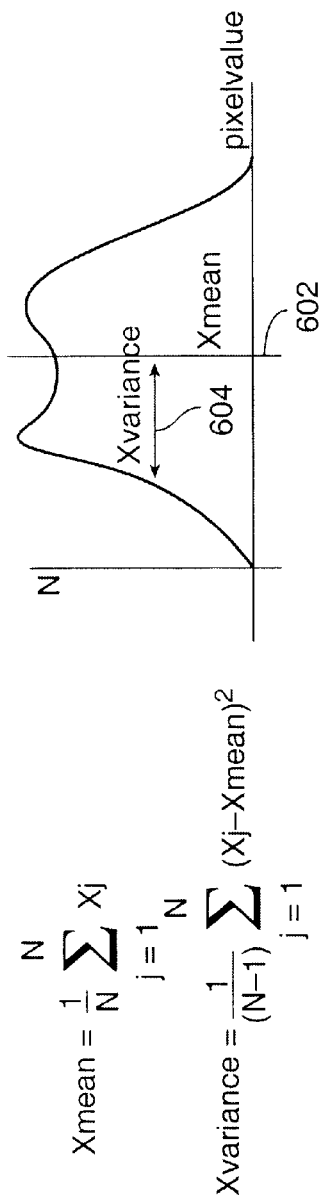

Feature extraction on the low frequency image information resulting from the compression step yields the statistical moments of the image pixel values as depicted in FIG. 6. In one particular embodiment of the invention, the mean 602 and variance 604 of the pixel values are the statistical moments which are calculated from low frequency information according to the following formulas:

$$X_{mean} = \frac{1}{N}\sum X_j$$

and, $$X_{variance} = \frac{1}{(N-1)}\sum (X_j - X_{mean})^2$$

wherein $X_j$ is the value of each pixel in the low frequency document image.

Figure 7:
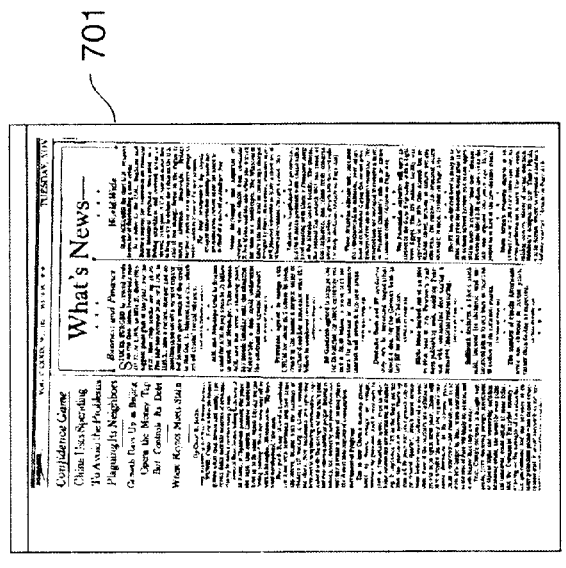
FIG. 7 depicts the determination of the number of words and number of pictures in a document image from connected component information extracted from high frequency image information according to one embodiment of the present invention.
Figure 7:
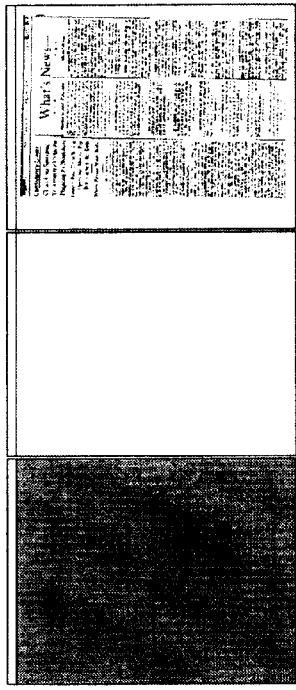
Figure 8:
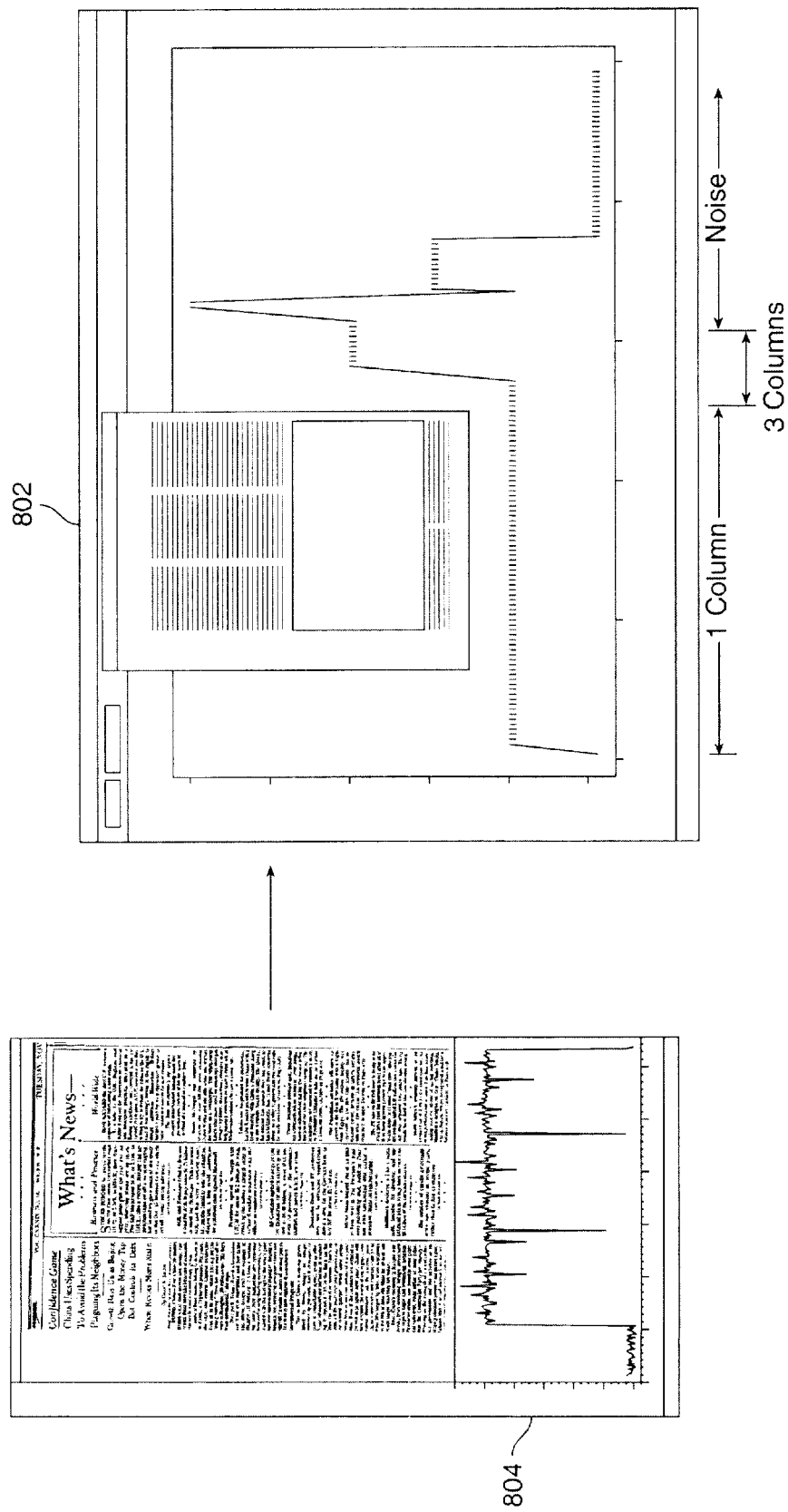
FIG. 8 depicts the determination of the number of columns in a document image from connected component information extracted from high frequency image information according to one embodiment of the present invention.

FIGS. 7 and 8 are illustrative of features extraction applied to the high frequency image information resulting from the compression step.

Features extraction on the high frequency image information is done by looking for connected components. The first step in processing is to perform a histogram equalization, in which the minimum and maximum gray values are calculated, then their range is adjusted to have values between 0 and 255. Histogram equalization is a standard image procedure technique well known to persons of ordinary skill in the art.

Finally, a connected component algorithm, which in the preferred embodiment is a four-connected component algorithm, is applied to the image information.

According to a four-connected component algorithm, processing of image data is done by looking at the four sides of a particular pixel for other pixels of similar gray level in searching for connected components. Pixels adjacent to the pixel under study at any of the four sites are aggregated together to form a connected component. By contrast, an eight-connected component algorithm would look not only to the four sides of a pixel, but also to pixels adjacent at any of the four vertices of a pixel in locating connected components.

Once connected components have been identified, features such as the total number of text words 702, pictures 704, and text columns 802, may be extracted from the connected component information. The feature of total number of text words is determined by examining the total number of connected components below a certain threshold size. The threshold value is set to discern connected components which belong to text as from connected component regions which are associated with pictures. The count of connected components below the threshold is the number of words. The count of the connected components exceeding the threshold is the number of pictures.

FIG. 8 depicts the processing underlying the determination of the number of columns of text. A plot of connected components (y-axis) vs. locations (x-axis) is depicted in FIG. 8 graph 804. Plot 802 in FIG. 8 depicts the number of transitions in graph 804 (y-axis) vs. the number of connected components (x-axis). In the plot designated by 802, the number of transitions is indicative of the number of columns in the image.

From observing the dominant plateaus in graph 802, it is possible to determine the predominant number of columns in a document. In the case of 802, the large picture causes this to be a predominantly one column document. However, the second plateau indicates that three columns are also present in the document. The peak detected at some high number indicates the word boundary noise, beyond this point no further column information can be extracted.

In a particular embodiment, the features extracted as described hereinabove are combined to form a "feature vector". The feature vector is useful in searching for its corresponding document image in a document image database. Techniques for searching and organizing document image databases are discussed in co-assigned co-pending U.S. patent application Ser. No. 08/936,336 now pending, entitled, "Navigation System for Document Image Database," (referenced above).

The invention has now been explained with reference to specific embodiments. Other embodiments will be apparent to those of ordinary skill in the art. It is therefore not intended that the invention be limited, except as indicated by the appended claims.

What is claimed is:

1. A method for searching a database containing a plurality of document images for a particular document image, said method comprising:

compressing each document image in said plurality of document images to obtain a compressed representation having a low-pass component and a high-pass component;

extracting image feature information from said compressed representation, wherein said extracting further comprises extracting statistical moments from said low-pass component and extracting connected component information from said high-pass component; and matching said image feature information with image feature information from said particular document image.

2. The method of claim 1 wherein said compressing step comprises recursively applying a pyramidal wavelet decomposition transform to said document images.

3. The method of claim 2 wherein said pyramidal wavelet decomposition transform comprises a CREW algorithm.

4. The method of claim 1 wherein said statistical moments comprise:

a mean value of pixel values; and a variance value of pixel values.

5. The method of claim 1 wherein said connected component information further comprises:

a number of words in said document image;

a number of pictures in said document image; and a number of columns in said document image.

6. The method of claim 1 further comprising:

extracting from said low-pass component an iconic representation as an index for searching.

7. A method for searching a database containing a plurality of document images in binary representation for a particular document image, comprising the steps of:

converting each said document image in binary representation to produce a grayscale representation of said document image;

compressing each said grayscale representation of each document image in said plurality of document images to obtain a compressed representation having a low-pass component and a high-pass component;

extracting image feature information from said compressed representation, wherein said extracting further comprises extracting statistical moments from said low-pass component and extracting connected components from said high-pass component; and matching said image feature information with image feature information from said particular document image.

8. The method of claim 7 wherein said compressing comprises:

recursively applying a pyramidal wavelet decomposition transform to said document images.

9. The method of claim 8 wherein said pyramidal wavelet decomposition transform comprises a CREW algorithm.

10. The method of claim 7 wherein said statistical moments comprise:

a mean value of pixel values; and a variance value of pixel values.

11. The method of claim 7 wherein said connected component information further comprises:

a number of words in said document image;

a number of pictures in said document image; and a number of columns in said document image.

12. The method of claim 7 wherein said converting comprises filtering said binary representation to produce a grayscale representation of said document image.

13. The method of claim 7 further comprising:

selecting said low-pass component for use as an icon.

14. A document image database organizing system comprising:

an electronic storage unit that stores a document image database;

a display that displays document images; and a processor unit coupled to said electronic storage device and said display, said processor unit operative to:

compress document images to obtain a compressed representation having a low-pass component and a high-pass component;

extract image feature information about example document images, said image feature information comprising statistical moments extracted from said low-pass component and connected components extracted from said high-pass component; and compare said image feature information from a particular document image to said image feature information from said plurality of document images in said database.

15. A document image database organizing system comprising:

an electronic storage unit that stores a document image database;

a display that displays document images; and a processor unit coupled to said electronic storage device and said display, said processor unit operative to:

convert document image formats;

compress document images to obtain a compressed representation having a low-pass component and a high-pass component;

extract image feature information about example document images, said image feature information comprising statistical moments extracted from said low-pass component and connected components extracted from said high-pass component; and compare said image feature information from a particular document image to said image feature information from said plurality of document images in said database.

16. A computer program product comprising:

code that compresses document images to obtain a compressed representation having a low-pass component and a high-pass component;

code that extracts image feature information from said compressed representation, said code further comprising code that extracts statistical moments from said low-pass component and code that extracts connected components from said high-pass component;

code that compares image feature information from a particular document image with image feature information from other document images; and a computer readable storage medium for storing the codes.

17. The computer program product of claim 16 wherein said code that compresses document images to obtain a compressed representation having a low-pass component and a high-pass component comprises code that recursively applies a pyramidal wavelet decomposition transform to said document images.

18. The computer program product of claim 17 wherein said pyramidal wavelet decomposition transform comprises a CREW algorithm.

19. The computer program product of claim 16 wherein said statistical moments comprise:

a mean value of pixel values; and a variance value of pixel values.

20. The computer program product of claim 16 wherein said connected component information further comprises:

a number of words in said document image;

a number of pictures in said document image; and a number of columns in said document image.

21. The computer program product of claim 16 further comprising code that extracts from said low-pass component an iconic representation as an index for searching.

22. A computer program product comprising:

code that converts binary represented document images to grayscale document images;

code that compresses document images to obtain a compressed representation having a low-pass component and a high-pass component;

code that extracts image feature information from said compressed representation, wherein said code that extracts further comprises code that extracts image feature information further comprises code that extracts statistical moments from said low-pass component and code that extracts connected components from said high-pass component;

code that compares image feature information from a particular document image with image feature information from other document images; and a computer readable storage medium for storing the codes.

23. The computer program product of claim 22 wherein said code that compresses document images to obtain a compressed representation having a low-pass component and a high-pass component comprises code that recursively applies a pyramidal wavelet decomposition transform to said document images.

24. The computer program product of claim 23 wherein said pyramidal wavelet decomposition transform comprises a CREW algorithm.

25. The computer program product of claim 22 wherein said statistical moments comprise:

a mean value of pixel values; and a variance value of pixel values.

26. The computer program product of claim 22 wherein said connected component information further comprises:

a number of words in said document image;

a number of pictures in said document image; and a number of columns in said document image.

27. The computer program product of claim 22 further comprising code that extracts from said low-pass component an iconic representation as an index for searching.

* * * * *